(12) United States Patent
Grajeda

(10) Patent No.: US 12,044,329 B2
(45) Date of Patent: Jul. 23, 2024

(54) TWO-STAGE VALVE ASSEMBLY

(71) Applicant: BWI (Shanghai) Co., Ltd., Shanghai (CN)

(72) Inventor: Yinko I. Grajeda, Kettering, OH (US)

(73) Assignee: BWI (SHANGHAI) CO., LTD., Shanghai (CN)

( * ) Notice: Subject to any disclaimer, the term of this patent is extended or adjusted under 35 U.S.C. 154(b) by 379 days.

(21) Appl. No.: 17/482,410

(22) Filed: Sep. 22, 2021

(65) Prior Publication Data

US 2023/0092746 A1    Mar. 23, 2023

(51) Int. Cl.
*F16K 31/06* (2006.01)
*F16K 1/54* (2006.01)

(52) U.S. Cl.
CPC ............ *F16K 31/0655* (2013.01); *F16K 1/54* (2013.01); *F16K 31/0693* (2013.01)

(58) Field of Classification Search
CPC ..... F16K 1/54; F16K 31/0655; F16K 31/0693
See application file for complete search history.

(56) References Cited

U.S. PATENT DOCUMENTS

| | | | | |
|---|---|---|---|---|
| 2,392,741 A | * | 1/1946 | Hurlburt | F16K 31/408 137/614.16 |
| 2,502,256 A | * | 3/1950 | Harding, Jr. | F16K 31/406 251/129.2 |
| 2,964,286 A | * | 12/1960 | Hoskins | F16K 31/408 251/30.04 |
| 2,968,464 A | * | 1/1961 | Olson | F16K 31/408 251/38 |
| 3,797,526 A | * | 3/1974 | Champeon | F16K 31/408 251/38 |
| 5,865,213 A | | 2/1999 | Scheffel et al. | |

(Continued)

FOREIGN PATENT DOCUMENTS

| | | |
|---|---|---|
| DE | 202016000441 U1 | 2/2016 |
| DE | 102016216293 A1 | 3/2018 |

(Continued)

OTHER PUBLICATIONS

Extended European Search Report issued on Feb. 7, 2023 for counterpart European patent application No. 22020452.3.

(Continued)

*Primary Examiner* — Eric Keasel
(74) *Attorney, Agent, or Firm* — William H. Honaker; DICKINSON WRIGHT PLLC

(57) ABSTRACT

The two-stage valve assembly for a vehicle lift system comprises an outer sleeve extending along an axis between a first end and a second end. A stator is located in the first end and a valve opening is located in the second end. The two-stage valve assembly includes an armature assembly for selectively closing the valve opening and opening the valve opening in a first-stage open position and a second-stage open position. The armature assembly comprises a plunger moveable along the axis that includes a poppet portion having a poppet seal oriented towards the second end. A plunger seat is moveable along the axis and located between the poppet portion and the valve opening. The plunger seat includes a seat seal for sealing against the valve opening. A seat channel extends through the seat seal and the plunger seat and is in fluid communication with the valve opening.

16 Claims, 7 Drawing Sheets

(56) References Cited

U.S. PATENT DOCUMENTS

| | | |
|---|---|---|
| 8,684,366 B2 | 4/2014 | Murakami et al. |
| 9,650,947 B1 | 5/2017 | Egami et al. |
| 10,202,035 B2 | 2/2019 | Ogiwara et al. |
| 10,953,860 B2 | 3/2021 | Stahr et al. |
| 2008/0093573 A1 | 4/2008 | Acar et al. |
| 2010/0284841 A1 | 11/2010 | Jahn et al. |
| 2012/0248357 A1 | 10/2012 | Jeon |
| 2012/0326065 A1 | 12/2012 | Ferguson et al. |
| 2013/0207016 A1 | 8/2013 | Schubitschew |
| 2019/0248353 A1 | 8/2019 | Kratzer |

FOREIGN PATENT DOCUMENTS

| | | |
|---|---|---|
| DE | 102019103447 A1 | 8/2020 |
| JP | 11180295 A | 7/1999 |
| WO | 2021042145 | 3/2021 |

OTHER PUBLICATIONS

First Office Action issued for corresponding Japanese Patent Application 2022-151127 mailed on Nov. 7, 2023, along with the English translation.

First Office Action issued on Dec. 13, 2023 for counterpart Korean patent application No. 10-2022-0119301, along with the English translation.

\* cited by examiner

TWO-STAGE VALVE ASSEMBLY

BACKGROUND OF THE INVENTION

1. Field of the Invention

The present invention generally relates to a two-stage valve assembly for redistributing fluid in a lift system of a vehicle.

2. Description of the Prior Art

It is oftentimes beneficial to adjust the height of a vehicle body. For example, by raising the vehicle body to an extended position or lowering the vehicle body to a constricted position, the ground and roof clearance can be modified permitting travel in conditions that would not otherwise be possible or advisable. Devices that facilitate this adjustment are traditionally provided in or around suspension struts of motor vehicles. Typically, such devices include a lift housing disposed on a center axis defining a chamber. A support tube is disposed in the chamber with the lift housing being movable along the center axis relative to the support tube. The movement of the lift housing is oftentimes driven using a hydraulic or pneumatic actuator. These actuators oftentimes include a solenoid poppet valves to control the pressures in the chamber. The poppet valves must be designed to meet system flow, pressure, temperature, and voltage specifications along with exhibiting robustness to function under multiple operating cycles.

In operations with higher flow requirements, larger flow and increased sealing areas reduce pressure capabilities. Thus, a valve in a closed position typically requires a larger return spring to be able to meet the increased counter-seal leak and pressure. To overcome these limitations, power input to the solenoid can be increased. However, the increase in solenoid operation is limited by the system's constraints, such as the physical size of the system components. Therefore, some operational parameters would require an overall increase of the solenoid valve package.

Accordingly, there is a continuing desire to improve upon the operational framework and efficiency of devices that adjust the height of a vehicle body.

SUMMARY OF THE INVENTION

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims. This section provides a general summary of the disclosure and is not to be interpreted as a complete and comprehensive listing of all of the objects, aspects, features and advantages associated with the present disclosure.

The invention provides for a two-stage valve assembly that provides a first-stage of fluid flow and a second-stage of fluid flow improving upon the operational framework and efficiency of traditional devices that have been used to selectively provide fluid flow. Further, the present invention provides for a two-stage valve assembly that has a simple design and a low cost in production.

It is one aspect of the present invention to provide a two-stage valve assembly. The two-stage valve assembly comprises an outer sleeve extending along an axis between a first end and a second end. A stator is located in the first end and a valve opening is located in the second end. The two-stage valve assembly includes an armature assembly for selectively closing the valve opening and opening the valve opening in a first-stage open position and a second-stage open position. The armature assembly comprises a plunger moveable along the axis that includes a poppet portion having a poppet seal oriented towards the second end. A plunger seat is moveable along the axis and located between the poppet portion and the valve opening. The plunger seat includes a seat seal for sealing against the valve opening. A seat channel extends through the seat seal and the plunger seat and is in fluid communication with the valve opening. The poppet seal closes the seat channel and the seat seal closes the valve opening in the closed position, the poppet seal is spaced from the seat channel in the first-stage open position, and the seat seal is spaced from the valve opening in the second-stage-open position.

It is another aspect of the present invention to provide a two-stage valve assembly. The two-stage valve assembly comprises an outer sleeve extending along an axis between a first end and a second end. A stator is located in the first end and a valve opening is located in the second end. A central body is located in the outer sleeve and extends between the stator and the valve opening, the central body defines a channel extending along the axis. The two-stage valve assembly includes an armature assembly for selectively opening and closing the valve opening. The armature assembly comprises a poppet portion having a poppet seal that is located between the central body and the valve opening and moveable along the axis. A plunger seat is moveable along the axis and located between the plunger and the valve opening. The plunger seat includes a seat seal for sealing against the valve opening, a seat channel extends through the seat seal and the poppet portion and is in fluid communication with the valve opening. The poppet seal closes the seat channel and the plunger seat closes the valve opening in the closed position.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Example embodiments will now be described more fully with reference to the accompanying drawings. In general, the subject embodiments are directed to a two-stage valve assembly for raising and lowering the height of a vehicle. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Referring to the Figures, wherein like numerals indicate corresponding parts throughout the several views, a two-stage valve assembly is provided for raising and lowering the height of the vehicle by redistributing fluid. The two-stage valve assembly improves upon the operational framework and efficiency of traditional devices that have been used to adjust the height of a vehicle body.

Figure 1:
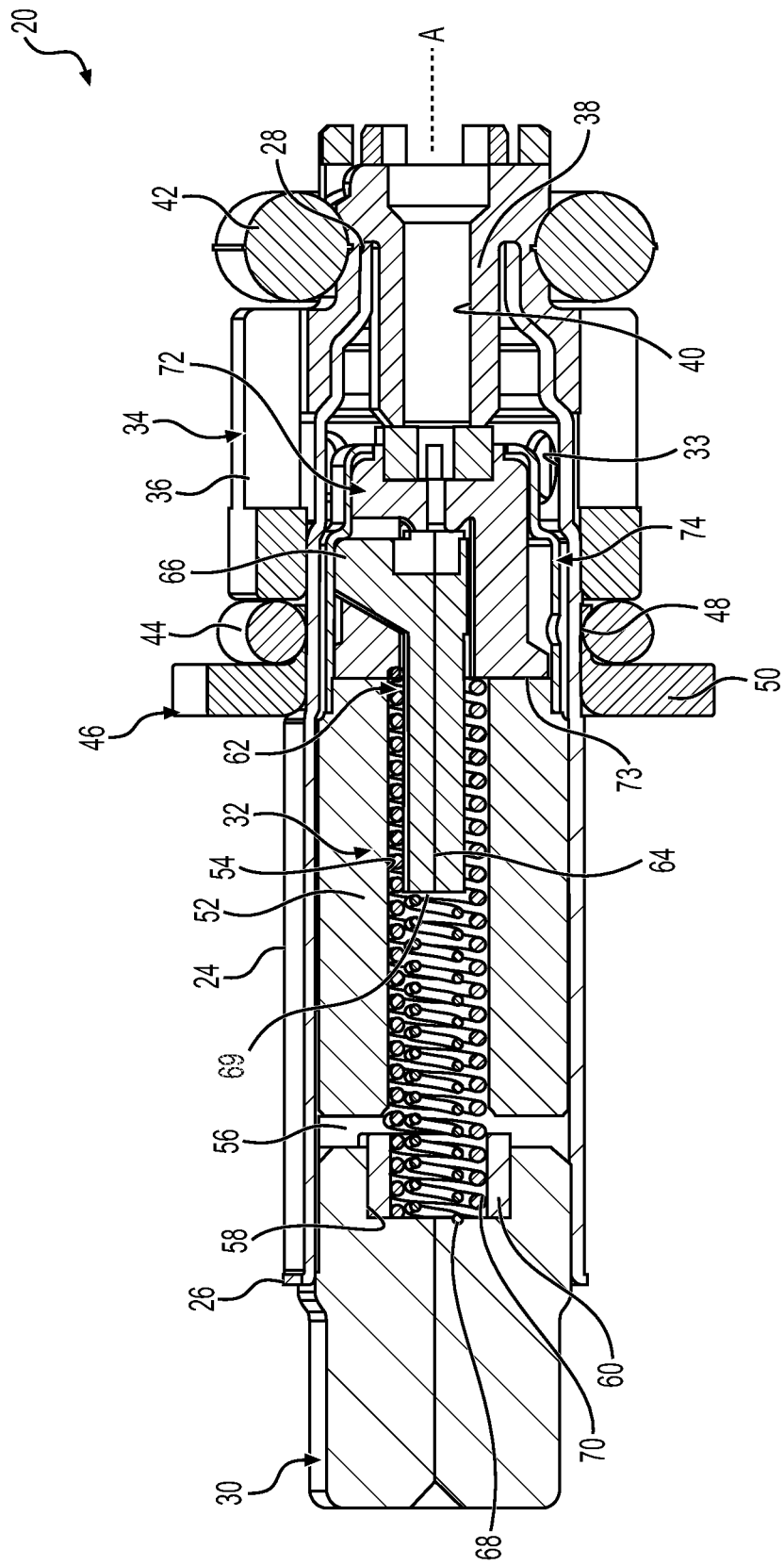
FIG. 1 is a side view of a two-stage valve assembly for raising and lowering the height of a vehicle in accordance with principles of the present disclosure.

With initial reference to FIG. 1, the valve assembly 20 has an outer sleeve 24 extending along an axis A between a first end 26 and a second end 28. The valve assembly 20 includes a stator 30 located in the first end 26 and an armature assembly 32 located within the outer sleeve 24 and moveable along the axis A. A valve cup 34 is located around an outside of the second end 28 and defines a generally annular shape that closes around the second end 28. The valve cup 34 includes a valve body 36 that extends around the outer sleeve 24 towards the second end 28 and narrows to a valve structure 38 that enters the second end 28 and extends within the outer sleeve 24 towards the first end 26 along the axis A. In some embodiments, the valve structure 38 may be tubular. The valve structure 38 defines a valve opening 40 that extends along the axis A for interfacing with the armature assembly 32. The outer sleeve 24 may include one or more outer apertures 33 near an end of the valve cup 34. A lower seal 42 is located around an exterior of the valve body 36 in axial alignment with the second end 28 and an upper seal 44 is located around the outer sleeve 24 near an end of the valve cup 34 facing the first end 26. The lower seal 42 and the upper seal 44 may both be annularly shaped and formed of elastic and the lower seal 42 may define a larger gauge than that of the upper seal 44.

With continued reference to FIG. 1, a mounting collar 46 is located adjacent to the valve cup 34 facing the first end 26 and includes a body portion 48 that wraps around the outer sleeve 24 and a flange portion 50 that extends radially outwardly from the body portion 48. The upper seal 44 wraps around an exterior of the body portion 48. An interior surface of the outer sleeve 24 may define a cylindrically-shaped chamber extending about the axis A. The stator 30 enters the first end 26 of the outer sleeve 24. The stator includes a recess 58 that is aligned with the axis A. A bushing 60 is located in the recess 58 and may extend axially towards the second end 28. A central body 52 is located in the outer sleeve 24 and extends between the stator 30 and the second end 28. The central body 52 defines a channel 54 that extends through the central body 52 along the axis A. As will be described in greater detail below, the channel 54 guides certain features of the armature assembly 32. The valve assembly 20 includes a closed position (FIG. 1), first-stage open position (FIG. 3), and a second-stage open position (FIG. 4). In the closed position, a gap 56 may be located between the central body 52 and the stator 30.

Figure 2:
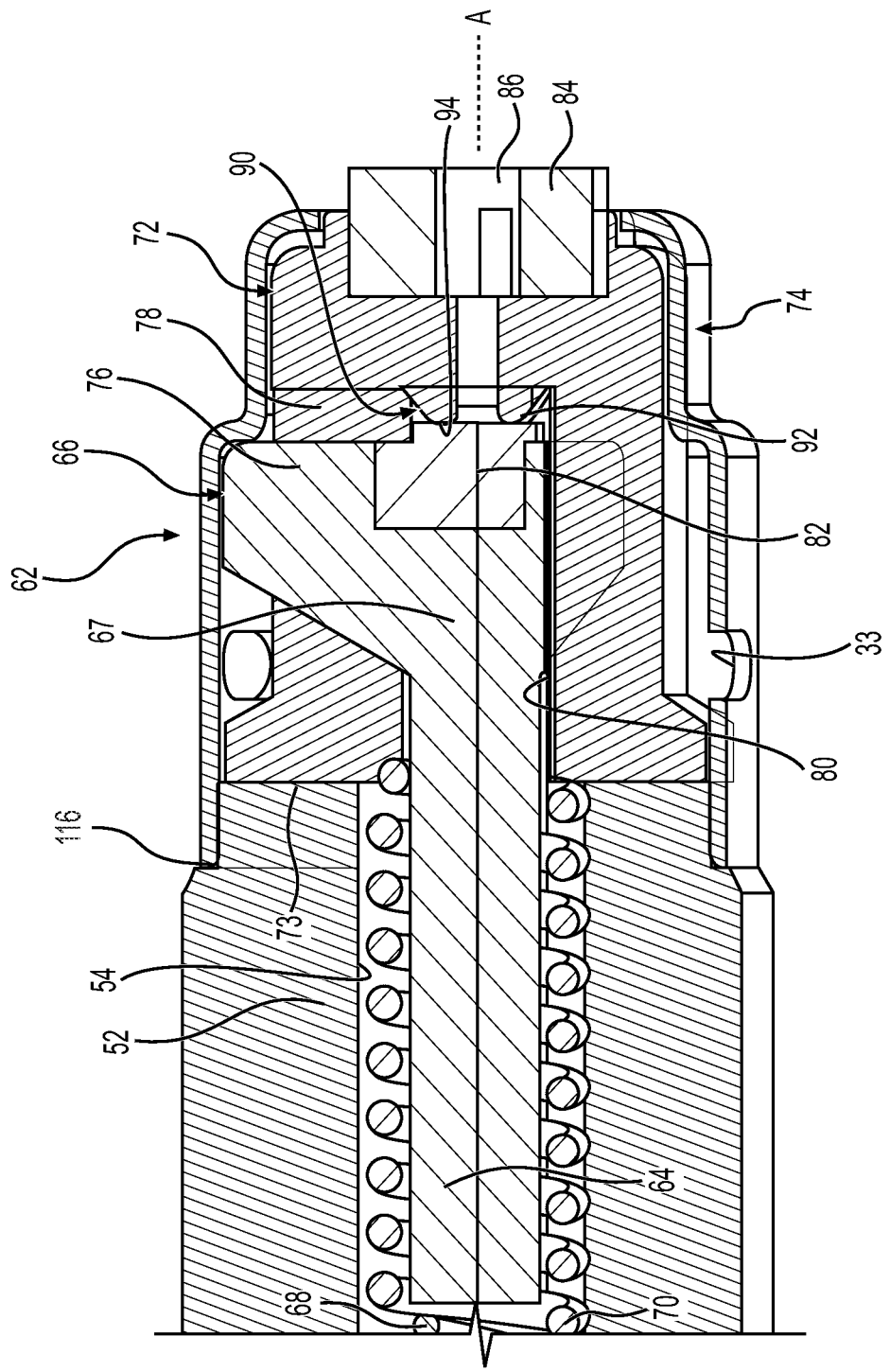
FIG. 2 is an enlarged view of an armature assembly of the two-stage valve assembly in a closed position.

As best illustrated in FIG. 2, the armature assembly 32 includes a plunger 62 extending along the axis A between a rod body 64 oriented towards the first end 26 and a poppet portion 66 oriented towards the second end 28. The armature assembly 32 is preloaded with a pair of springs that include a first-stage preload spring 68 and a second-stage preload spring 70. The first-stage preload spring 68 abuts against a face end 69 of the rod body 64 and extends into the recess 58, through the bushing 60, and in abutment with the stator 30. The second-stage preload spring 70 extends from a plunger seat 72, around the rod body 64, around the first-stage preload spring 68, into the recess 58, through the bushing 60, and in abutment with the stator 30. The plunger seat 72 is located within the outer sleeve 24 between the poppet portion 66 and the second end 28. A seat sleeve 74 surrounds the plunger seat 72 and locates it within the outer sleeve 24. The second-stage preload spring 70 extends between and is in abutment with the stator 30 and a front face 73 of the plunger seat 72. The central body 52 extends between the stator 30 and the front face 73 of the plunger seat 72. In operation, the channel 54 in the central body 52 locates and guides the first-stage preload spring 68, the second-stage preload spring 70, and the rod body 64.

The poppet portion 66 includes a poppet body 67 and a plurality of fins 76 extending radially outwardly therefrom. In some embodiments, the plurality of fins 76 may include three or more fins 76 that are circumferentially equidistant. The plunger seat 72 includes a plurality of fin channels 78 (e.g., three) for slidably receiving the fins 76 and a central opening 80 for slidably receiving the poppet body 67 between the fins 76. A front face of the poppet portion 66 includes a poppet seal 82 and a front face of the plunger seat 72 includes a seat seal 84. A seat channel 86 extends through the seat seal 84 and the plunger seat 72 and is in fluid communication with the valve opening 40. The seat channel 86 is in alignment with and extends into the central opening 80 for direct interface with the poppet portion 66. A surface 90 of the plunger seat 72 within the central opening 80 that interfaces with the poppet seal 82 may include a non-flat shape. For example, the surface 90 may include a wall 92 having a conical-shape that outlines a portion of the seat channel 86 and narrows to an interface surface 94 facing the poppet seal 82. The seat channel 86 may become wider near the interface surface 94. As such, the poppet seal 82 may compress against the interface surface 94, at least partially into the seat channel 86, and around a portion of an exterior of the wall 92, when the valve assembly 20 is in the closed position. In some embodiments, the seat channel 86 has a different cross-sectional dimension than the valve opening 40, such as a smaller cross-sectional dimension that provides a slower flow rate.

Figure 3:
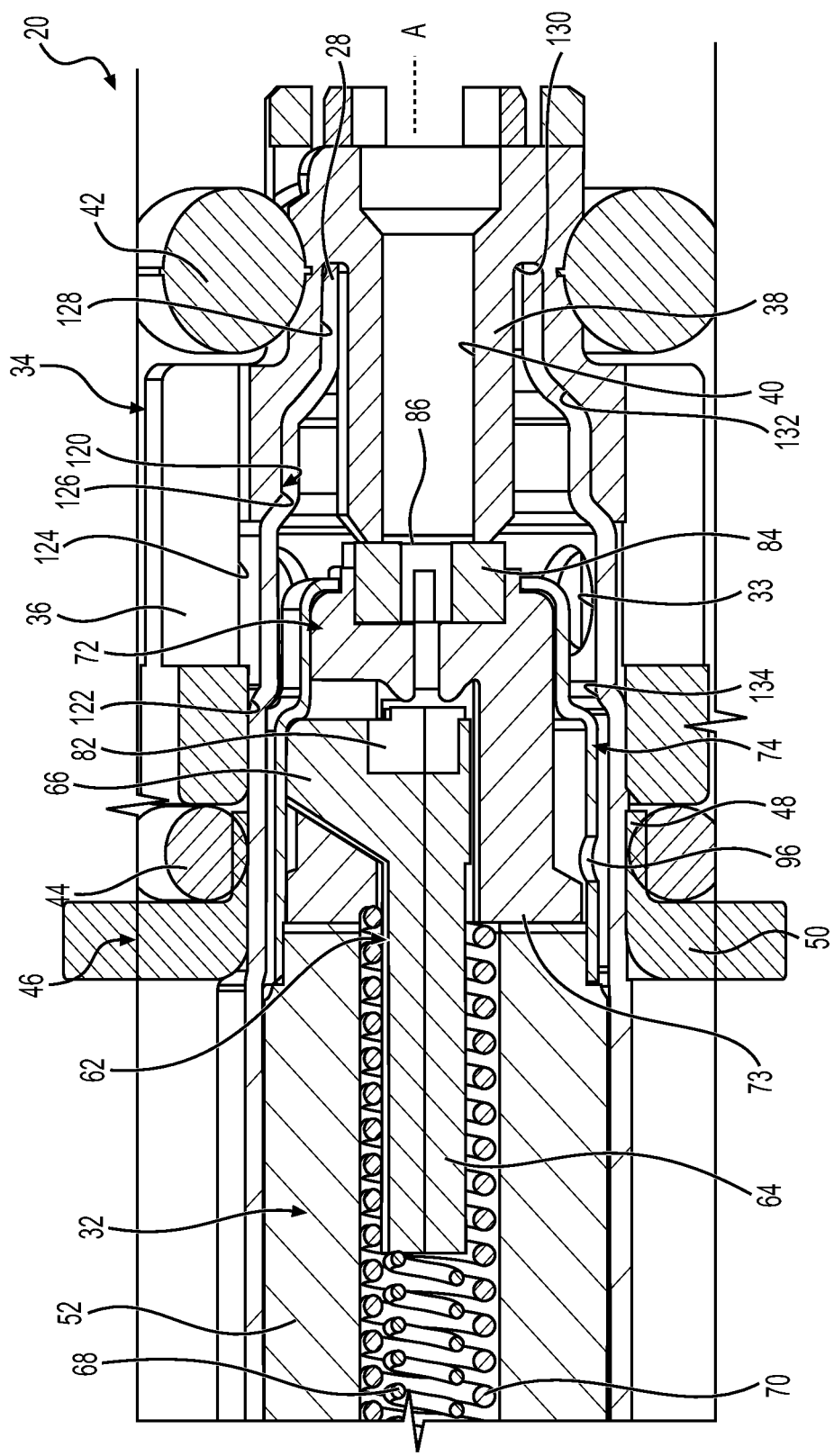
FIG. 3 is an enlarged view of the armature assembly of the two-stage valve assembly in a first-stage open position.
Figure 4:
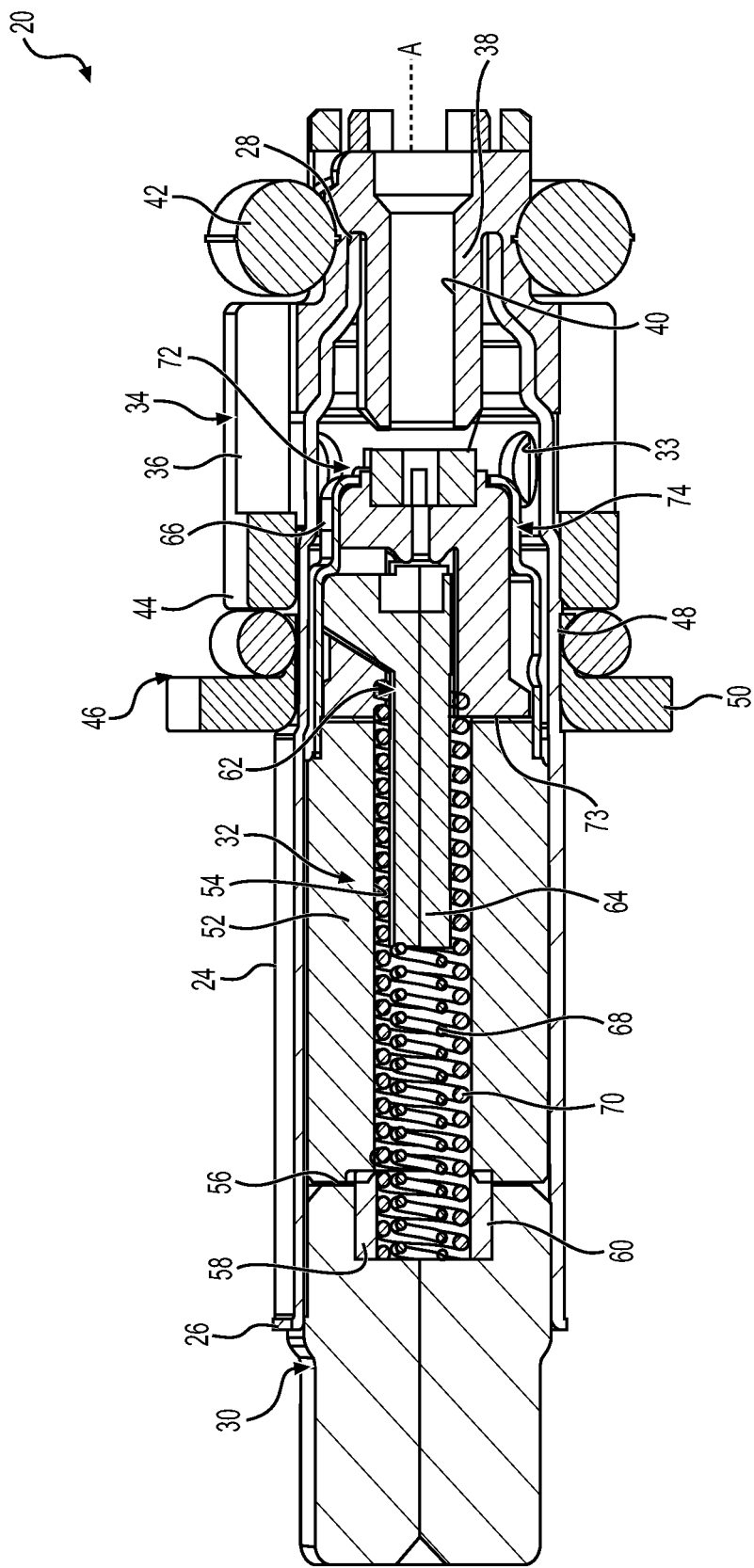
FIG. 4 is an enlarged view of the armature assembly of the two-stage valve assembly in a second-stage open position.

With reference now to FIG. 3, the armature assembly 32 is illustrated in the first-stage open position. In the first-stage open position, the stator 30 attracts the plunger 62 and overcomes the preload of the first-stage preload spring 68, thereby causing the poppet seal 82 to move from the plunger seat 72 in a spaced relationship with the interface surface 94. The first-stage open position permits fluid to flow through the valve opening 40, the seat channel 86, and through the fin channels 78 for a first pressure reduction.

With reference now to FIG. 4, the armature assembly 32 is illustrated in the second-stage open position. After the first pressure reduction, the stator 30 attracts the plunger seat 72 and overcomes the preload of the second-stage preload spring 70 moving the seat seal 84 away from the valve opening 40 to permit a greater fluid flow and pressure reduction in the second-stage open position. With the first pressure reduction, previous requirements of a larger return spring to meet the increased counter-seal leak and pressure is eliminated.

Figure 5:
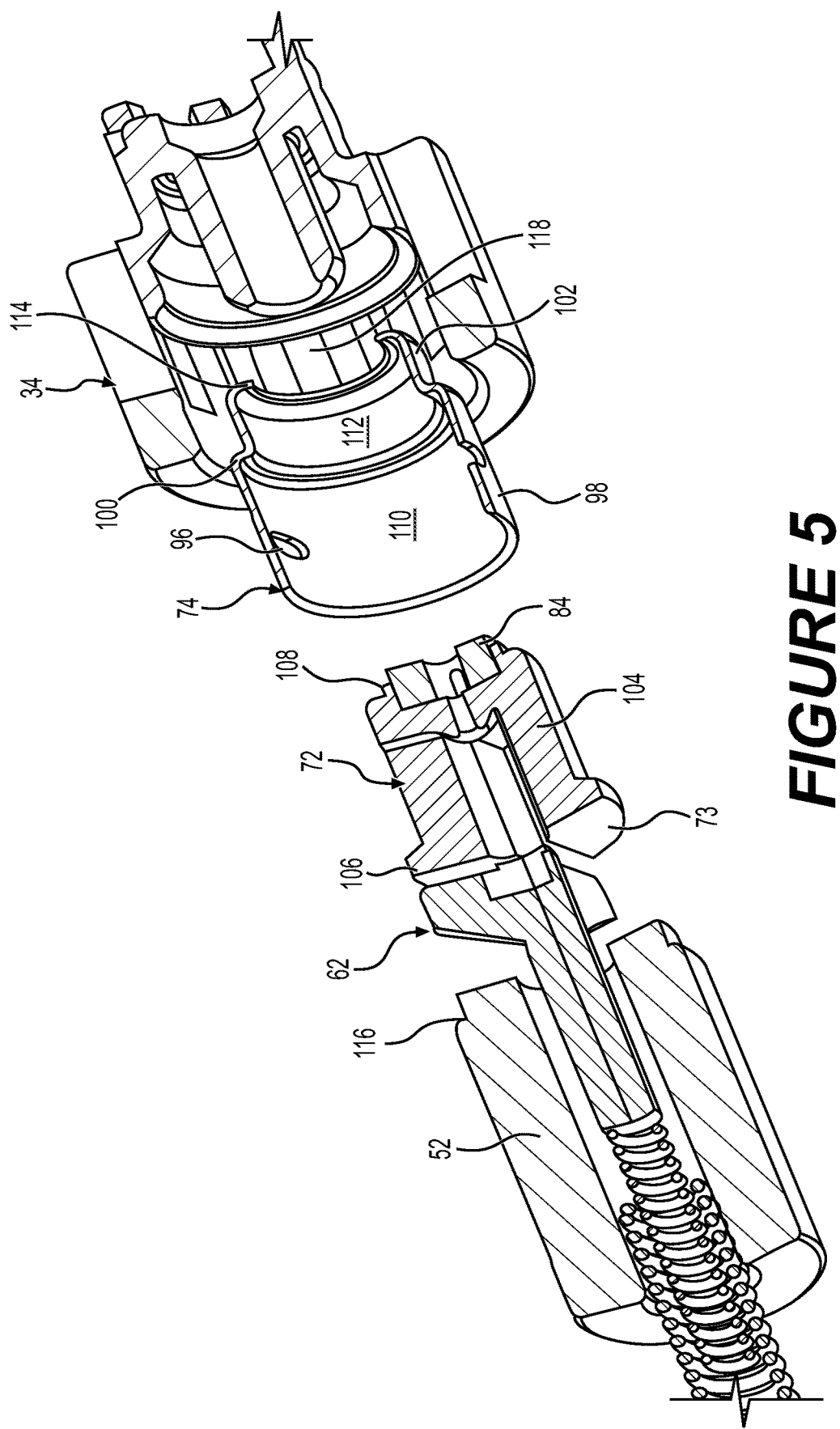
FIG. 5 is a disassembled view of certain features in the two-stage valve assembly.

FIG. 5 is a disassembled view of the armature assembly 32. The seat sleeve 74 includes at least one sleeve aperture 96 for permitting fluid flow therethrough. The at least one sleeve aperture 96 may be located in circumferential alignment with one more of the fin channels 78. The seat sleeve 74 further includes a first sleeve wall 98 and a step 100 that extends radially inwardly into a second sleeve wall 102. The plunger seat 72 includes a body portion 104 extending between a flanged portion 106 and a seal-retaining portion 108. The flanged portion 106 is adjacent to the front face 73 and extends radially outwardly from the body portion 104 and the seal-retaining portion 108 is located adjacent to the seat seal 84 and extends radially inwardly from the body portion 104.

When assembled, the first sleeve wall 98 may define a first opening 110 sized for accommodating and guiding the fins 76 and the flanged portion 106. In some embodiments, the first opening 110 is cylindrically shaped and the first sleeve wall 98 slidably interfaces with radially outermost portions 107 of the fins 76 and the flanged portion 106. The second sleeve wall 102 may define a second opening 112 sized for accommodating the body portion 104. In some embodiments, the body portion 104 slidably interfaces with the second sleeve wall 102. A sleeve flange 114 may extend radially inwardly from the second sleeve wall 102 opposite the step 100 for accommodating the seal-retaining portion 108. In some embodiments, the seal-retaining portion 108 slidably interfaces with the sleeve flange 114. In some embodiments, the central body 52 may include a stepped portion 116 that extends radially inwardly towards the seat sleeve 74 such that the stepped portion 116 can be located within the first opening 110 and the non-stepped portion of the central body 52 can abut the first sleeve wall 98.

With reference to FIG. 3 and FIG. 5, the valve body 36 includes a series of valve body channels 118 in fluid communication with at least one of the outer apertures 33 and at least one of the sleeve apertures 96 for permitting fluid transfer in the first-stage open position and the second-stage open position. The valve cup 72 may further include an interior cup wall 120 that defines, in sequence, a first cup portion 122, a second cup portion 124, a third cup portion 126, and a fourth cup portion 128 that terminates around a base 130 for abutment with the second end 28 of the outer sleeve 24. Each of the cup portions 122, 124, 126, and 128 may be spaced by a cup step 132 that may be conically shaped. As such, the first cup portion 122 may extend to one of the cup steps 132 that extends radially inwardly to the second cup portion 124, the second cup portion 124 may extend to another of the cup steps 132 that extends radially inwardly to the third cup portion 126, and the third cup portion 126 may extend to another of the cup steps 132 that extends radially inwardly to the fourth cup portion 128. As best illustrated in FIG. 3, the outer sleeve 24, near the second end 28, may taper between a series of outer steps 134 to match the profile of the sequence of cup portions 122, 124, 126, and 128 and the cup steps 132.

Figure 6:
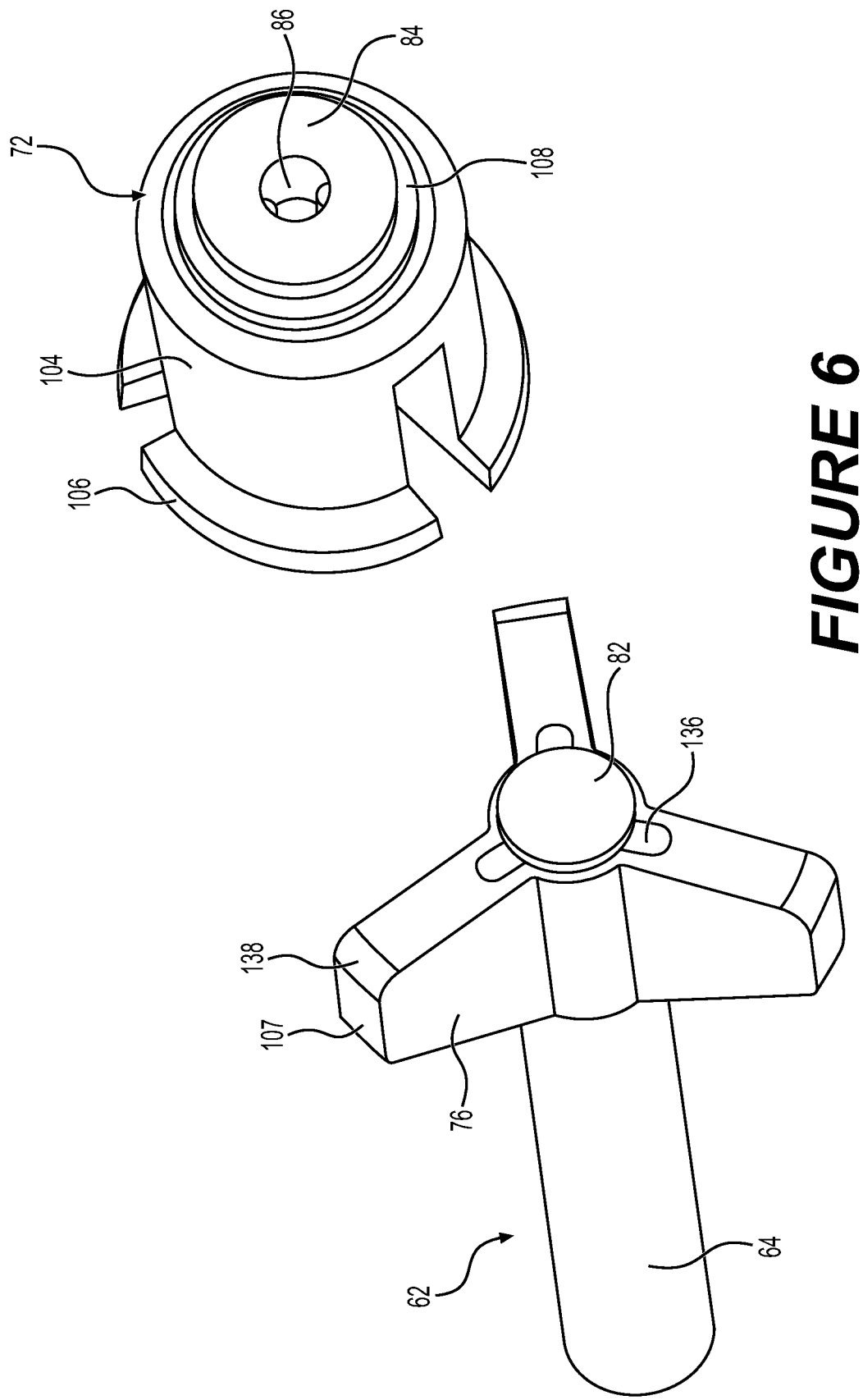
FIG. 6 is a disassembled view of the armature assembly illustrating a first side of a plunger seat.
Figure 7:
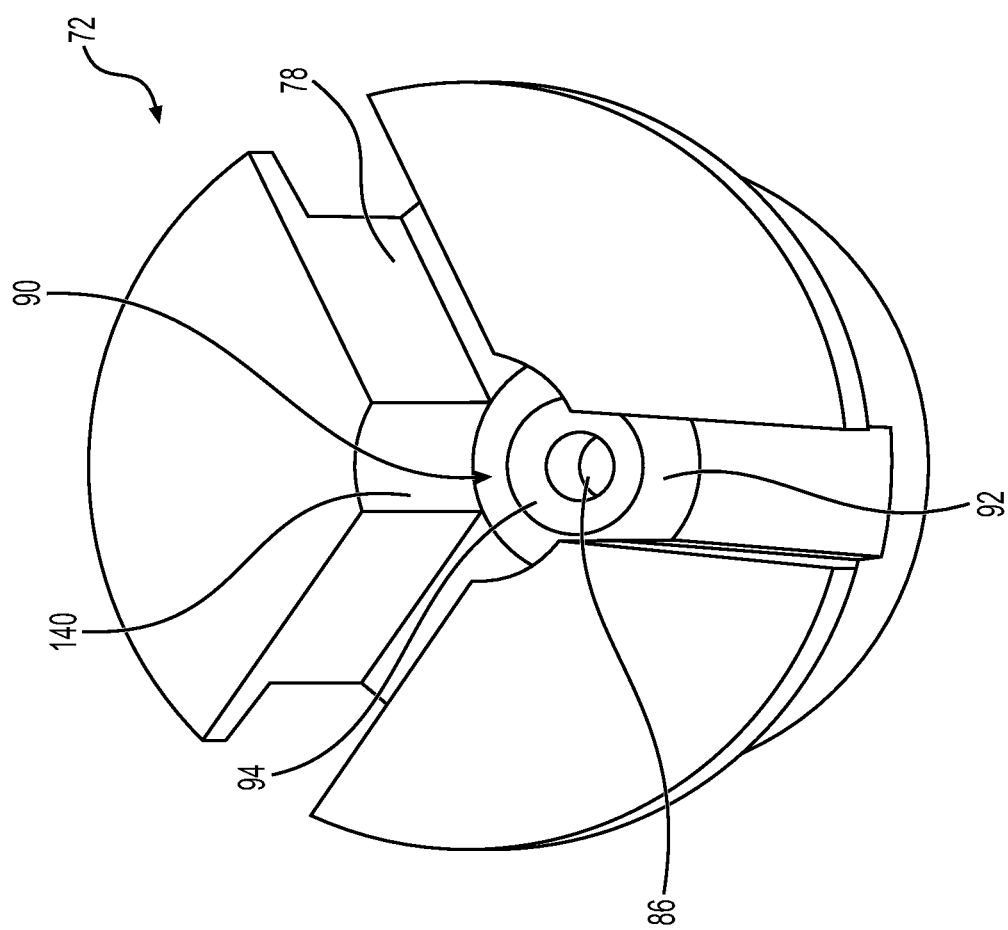
FIG. 7 is a perspective view of a second side of the plunger seat.

FIG. 6 is a disassembled view of the armature assembly 32 illustrating a side of the plunger seat 72 oriented towards the second end 28. In some embodiments, the poppet seal 82 includes tab portions 136 molded into the fins 76. Each of the fins 76 may include a rounded outer edge 138 to ease assembly and sliding movement. FIG. 7 is a perspective view of the plunger seat 72 oriented towards the first end 26. The central opening 80 may include a rounded surface 140 between fin channels 78 for facilitating slidable movement and contact of the poppet body 67.

The two-stage valve assembly 20 may be integrated in a variety of vehicular systems. In some embodiments, the two-stage valve assembly 20 may be integrated into a vehicular lift system, such as an air lift system. As such, two-stage valve assembly 20 may selectively permit fluid transfer between two or more chambers. For example, in one of the open positions, a fluid may flow from a first chamber through the valve opening 40 whereafter the fluid may be transferred through the valve body channels 118, the outer apertures 33, and the sleeve apertures 96 to a second chamber. In operation, the two-stage valve assembly 20 may typically operate in the closed position. A magnetic force generated from the stator 30 attracts the armature assembly 32 to overcome forces (e.g., pneumatic pressure) and spring 68, 70 preload. Because increases in flow requirements have traditionally required larger valve openings and increased pressure, the present invention provides the first-stage open position to provide an initial pressure reduction. In the first-stage open position, the poppet seal 82 is spaced from the seat channel 86. Once the pressure reduction is achieved, the stator 30 can move the seat seal 84 and the two-stage valve assembly 20 is moved to the second-stage open position permitting a greater fluid flow. In some embodiments, the poppet seal 82 may be spaced from the seat channel 86, in sealing engagement with the seat channel 86, or move between a spaced and sealing engagement during the second-stage open position.

It should be appreciated that the foregoing description of the embodiments has been provided for purposes of illustration. In other words, the subject disclosure it is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varies in many ways. Such variations are not to be regarded as a departure from the disclosure, and all such modifications are intended to be included within the scope of disclosure.

What is claimed is:

1. A two-stage valve assembly comprising:
   an outer sleeve extending along an axis between a first end and a second end;
   a stator located in the first end and a valve opening located in the second end; and
   an armature assembly for selectively closing the valve opening and opening the valve opening in a first-stage open position and a second-stage open position, the armature assembly comprising:
   a plunger moveable along the axis and including a poppet portion having a poppet seal oriented towards the second end;

a plunger seat moveable along the axis and located between the poppet portion and the valve opening, the plunger seat including a seat seal for sealing against the valve opening, a seat channel extending through the seat seal and the plunger seat that is in fluid communication with the valve opening; and wherein the poppet seal closes the seat channel and the seat seal closes the valve opening in the closed position, the poppet seal is spaced from the seat channel in the first-stage open position, and the seat seal is spaced from the valve opening in the second-stage-open position, wherein a first-stage preload spring extends from the stator to the plunger and biases the plunger towards the seat channel, wherein a second-stage preload spring extends from the stator to the plunger seat and biases the plunger seat towards the valve opening.

2. The two-stage valve assembly as set forth in claim 1, wherein the first-stage preload spring defines a smaller preload than the second-stage preload spring.

3. The two-stage valve assembly as set forth in claim 1, wherein the poppet portion defines a plurality of fins extending radially outwardly and the plunger seat defines a plurality of fin channels for accommodating the fins and guiding the poppet portion along the axis.

4. The two-stage valve assembly as set forth in claim 3, wherein the plunger seat is located in a seat sleeve and wherein the plunger seat includes a body portion and a flanged portion extending radially outwardly from the body portion.

5. The two-stage valve assembly as set forth in claim 4, wherein the seat sleeve includes a first sleeve wall sized to make slidable contact with the flanged portion.

6. The two-stage valve assembly as set forth in claim 5, wherein the seat sleeve includes a second sleeve wall sized to make slidable contact with the body portion.

7. The two-stage valve assembly as set forth in claim 6, wherein the fins each include a radially outermost portion that is sized to make slidable contact with the first sleeve wall.

8. The two-stage valve assembly as set forth in claim 1, wherein the plunger seat includes a surface facing the poppet seal and encircling the seat channel that is non-flat.

9. The two-stage valve assembly as set forth in claim 8, wherein the surface includes a wall having a conical shape narrowing towards the poppet seal.

10. A two-stage valve assembly comprising:
an outer sleeve extending along an axis between a first end and a second end;
a stator located in the first end and a valve opening located in the second end;
a central body located in the outer sleeve and extending between the stator and the valve opening, the central body defining a channel extending along the axis; and
an armature assembly for selectively opening and closing the valve opening, the armature assembly comprising:
a poppet portion having a poppet seal located between the central body and the valve opening and moveable along the axis;
a plunger seat moveable along the axis located between the plunger and the valve opening, the plunger seat including a seat seal for sealing against the valve opening, a seat channel extending through the seat seal and poppet portion that is in fluid communication with the valve opening; and wherein the poppet seal closes the seat channel and the plunger seat closes the valve opening in the closed position, wherein a first-stage preload spring extends from the stator through the channel in the central body to the plunger and biases the plunger towards the seat channel, wherein a second-stage preload spring extends from the stator around the first-stage preload spring and through the channel in the central body to the plunger seat and biases the plunger seat towards the valve opening.

11. The two-stage valve assembly as set forth claim 10, wherein a valve cup is sealed to the second end of the outer sleeve, the valve cup including a valve structure that is tubular-shaped and extends from the second end towards the first end of the outer sleeve, the valve opening defined by the valve structure.

12. The two-stage valve assembly as set forth in claim 11, wherein the outer sleeve defines at least one outer aperture and the valve cup defines at least one valve body channel in fluid communication with the at least one outer aperture.

13. The two-stage valve assembly as set forth in claim 12, wherein the plunger seat is located in a seat sleeve and wherein the seat sleeve defines at least one sleeve aperture in communication with the outer aperture and the valve body channel.

14. The two-stage valve assembly as set forth in claim 10, wherein the open position includes a first-stage open position when the poppet seal is moved by the stator in a spaced relationship from the seat channel, and wherein the open position includes a second-stage open position when the seat seal is moved by the stator in a spaced relationship with the valve opening.

15. The two-stage valve assembly as set forth in claim 14, wherein the first-stage open position includes a first flow rate and the second-stage open position includes a second flow rate greater than the first flow rate.

16. The two-stage valve assembly as set forth in claim 10, wherein the plunger includes a rod body and the first-stage preload spring abuts a face end of the rod body and the second-stage preload spring extends around the rod body to the plunger seat.

* * * * *